United States Patent
Jones

(10) Patent No.: US 9,204,296 B2
(45) Date of Patent: Dec. 1, 2015

(54) APPARATUS AND METHODS FOR KEY GENERATION

(71) Applicant: General Dynamics C4 Systems, Inc., Scottsdale, AZ (US)

(72) Inventor: Alan Edward Jones, Wiltshire (GB)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 74 days.

(21) Appl. No.: 13/933,790

(22) Filed: Jul. 2, 2013

(65) Prior Publication Data

US 2014/0302820 A1   Oct. 9, 2014

(30) Foreign Application Priority Data

Apr. 8, 2013   (GB) .................... 1306350.8

(51) Int. Cl.
| | |
|---|---|
| H04L 9/32 | (2006.01) |
| H04W 12/04 | (2009.01) |
| H04L 9/08 | (2006.01) |
| H04W 76/02 | (2009.01) |

(52) U.S. Cl.
CPC .............. *H04W 12/04* (2013.01); *H04L 9/0861* (2013.01); *H04L 9/3215* (2013.01); *H04L 2209/80* (2013.01); *H04W 76/023* (2013.01)

(58) Field of Classification Search
CPC .................................................. H04W 12/04
USPC ........................................ 713/171; 455/411
See application file for complete search history.

(56) References Cited

U.S. PATENT DOCUMENTS 8,873,747 B2 *   10/2014   Polzin et al. ................ 380/44

FOREIGN PATENT DOCUMENTS

| GB | 2379588 A | 3/2003 |
|---|---|---|
| WO | 01/22755 A1 | 3/2001 |

OTHER PUBLICATIONS

Extended European Search Report From European Patent Application No. 14163809.8-1870; Dated Aug. 5, 2014.
European Telecommunication Standard; ETS 300 396-1; Terrestrial Trunked Radio (TETRA) Technical Requirements for Direct Mode Operation (DMO); Part 1; General Network Design;European Telecommunications Standards Institute; pp. 1-34; Mar. 1998.
ETSI TS 133 102 V3.6.0; Technical Specification; Universal Mobile Telecommunications System (UMTS); 3G Security; Security Architecture (3GPP TS 33.102 Version 3.6.0 Release 1999); pp. 1-64; Oct. 2000.

* cited by examiner

*Primary Examiner* — Anthony Brown
(74) *Attorney, Agent, or Firm* — Fitch Even Tabin & Flannery LLP

(57) ABSTRACT

A method for key generation at a terminal device supporting at least two communication modes of operation is described. The method comprises, at a terminal device comprising a key derivation function: receiving at least one input parameter from a first wireless communication system; generating a first key in the key derivation function using the received at least one input parameter and at least one first locally stored input parameter in order to transmit in a first mode of operation on the first wireless communication system; and generating a second key in the key derivation function solely using at least one second locally stored input parameter in order to transmit in a second mode of operation on a second wireless communication system; wherein the at least one second locally stored input parameter is arranged to enable the second key to be used as the first key.

20 Claims, 8 Drawing Sheets

APPARATUS AND METHODS FOR KEY GENERATION

RELATED APPLICATION(S)

This application claims the benefit of United Kingdom Application No. 1306350.8 filed Apr. 8, 2013. The content of this application is fully incorporated herein in its entirety

FIELD OF THE INVENTION

The field of this invention relates to methods and apparatus for securing communications, for example in Direct Mode Communication Systems.

BACKGROUND OF THE INVENTION

A recent development in third generation (3G) wireless communications is the long term evolution (LTE) cellular communication standard, sometimes referred to as $4^{th}$ generation (4G) systems. Both of these technologies are compliant with third generation partnership project (3GPP™) standards. Irrespective of whether these LTE spectral allocations use existing second generation (2G) or 3G allocations being re-farmed for fourth generation (4G) systems, or new spectral allocations for existing mobile communications, they will be primarily paired spectrum for frequency division duplex (FDD) operation.

Security is an important feature of all 3GPP radio access technologies, particularly LTE, which provides security in a similar way to its predecessors UMTS and GSM. In LTE, two functions are provided for the maintenance of security. The first is ciphering, which is used in order to protect data streams from being received by a third party, and is generally utilised for both control plane data and user plane data. The second is integrity protection, which allows the receiver to detect packet insertion or replacement, and is utilised for control plane data.

In the Evolved Packet System (EPS) security architecture, there is a secure communication link between the Mobility Management Entity (MME) and User Equipment (UE), and a secure communication link between the evolved NodeB (eNB) and UE. Generally, MME security is utilised to protect Non Access Stratum (NAS) signalling, whereas eNB security is generally utilised to protect both control plane and user plane communications links.

The subscriber-authentication function in LTE/3GPP EPS is based on the UMTS authentication and key agreement (UMTS AKA) protocol. This protocol provides mutual authentication between the UE and the core network, ensuring robust charging and guaranteeing that no fraudulent entities can pose as a valid network node. It should be noted that some systems, for example GSM Subscriber Identity Modules are not allowed in LTE because they do not provide adequate security.

EPS AKA provides a root key from which a key hierarchy is derived. The keys in this hierarchy are used to protect signalling and user plane traffic between the UE and network. Generally, the security process starts with the UE sending its identity (e.g. IMSI) to the MME, and then the MME sending the IMSI to a Home Subscriber Server (HSS) for authentication. For every subscription stored there is a corresponding security key 'K' stored and protected within the HSS, as well as being stored on the Universal Subscriber Identity Module (USIM) in the UE.

FIG. 1 illustrates a simplified block diagram of the EPS security architecture as defined in the art. The HSS 102 is required to produce an EPS authentication vector 106 from EPS authentication module 104, which is used to enable mutual authentication between the UE and the network. Generally, the USIM and the Authentication centre (AuC) component of the HSS implement a common security algorithm that has been selected by a network operator, for example MILENAGE, which is used to produce the EPS authentication vector 106. An EPS authentication vector 106 is produced in the EPS authentication module 104 from inputs K 108 and RAND 110. K 108 is a security key and RAND 110 is a bit stream that is created locally by the AuC. After the EPS authentication vector 106 has been generated, it is passed to the MME 112.

The EPS authentication vector comprises four main elements, being:
  random number or random challenge RAND 110,
  expected response (XRES) produced with inputs from RAND 110 and K 108,
  authentication token (AUTN), and
  intermediate key $K_{ASME}$ that is used by MME 112 to derive further keys.

The MME 112, receives the EPS authentication vector 106 from the HSS 102 and stores the expected response value XRES, and forwards RAND and AUTN to eNB 114. The eNB 114 transmits 116 RAND and AUTN over an air interface to UE 118. The UE 118 uses the permanent key 'K', which, as discussed above, is securely stored on the USIM and in the HSS, and RAND to locally produce key $K_{ASME}$ 117 in EPS authentication module 120. Further, the UE 118 compares a locally generated version of AUTN with the signalled version of AUTN from the eNB 114. If the local and received values of AUTN are in agreement, then the UE 118 has authenticated the network. Assuming the UE 118 has authenticated the network, the UE transmits a response RES 122 to the MME 112. The MME 112 compares the received value of RES 122 with the stored value of XRES in module 130. If the value of XRES and RES are in agreement, then the UE 118 has been authenticated by the MME 112. The abovementioned process is referred to as the Authentication Key agreement (AKA) procedure.

After the AKA procedure, the next stage in the security process is to derive keys that are to be used to secure communications links between the UE 118 and the network. Within the EPS security architecture of FIG. 1, there are two main groups of security algorithms employed to derive keys used to secure communications links between the UE 118 and the network. The first group of security algorithms are EPS integrity algorithms (EIA) 132 that are used to integrity protect signalling messages, for example NAS signalling and RRC signalling, that are sent from/to the MME 112 (or eNB) and the UE 118. Generally, the EIA produces a bit stream or message authentication code (MAC) that is attached to the message before transmission, wherein the bit stream is a function of the message. If the message has been interfered with, then the receiving EIA may produce a different MAC. The second group of security algorithms are EPS encryption algorithms (EEA) 134 that are used to cipher the plain text of both signalling and user data.

FIG. 2 illustrates an EPS key hierarchy as defined by 3GPP. The permanent key 'K' 108 is stored in the USIM and AuC of the HSS 102, and is situated at the top of the key hierarchy. The parameters CK, IK 205 are derived using K 108 and, in this example, comprise the cipher key (CK) and the integrity key (IK), which are generally 128 bits in length. The key $K_{ASME}$ 117 and all its derivatives employ a common algorithm referred to in this example as key derivation function (KDF) 136.

The key $K_{ASME}$ 117 is utilised by the MME 112 and UE 118 to derive keys for NAS integrity protection and NAS ciphering ($K_{NASint}$ 138 and $K_{NASenc}$ 140). The MME 112 and UE 118 derive the eNB key $K_{eNB}$ 113 and next hop (NH) 211, which is used to provide forward security.

Referring back to FIG. 1, the MME 112 transmits 142 key $K_{eNB}$ 113 to the eNB 114 and requests a secure signalling connection be established with the UE 118 over the air-interface. The eNB 114 derives the keys $K_{RRCint}$ 144, $K_{RRCenc}$ 146 and $K_{UPenc}$ 148. Further, the UE 118, as part of the security procedure, derives the same identical keys as the eNB 114 namely, $K_{RRCint}$ 144, $K_{RRCene}$ 146 and $K_{UPenc}$ 148.

In order to utilise the abovementioned generated keys, they may require activation prior to use. After the AKA procedure has been completed, the MME 112 may activate security in the MME 112 by running, for example, a security mode procedure. In this example, the MME 112 transmits a message security command to the UE 118, which may be integrity protected using key $K_{NASint}$ 138. The UE 118 may check the validity of this message, and subsequently transmit a message security mode complete to the MME 112, which may be both integrity protected and ciphered using the keys $K_{NASint}$ 138 and $K_{NASenc}$ 140. If these keys are received correctly, the connection between the UE 118 and MME 112 is now secure. In this example, the eNB 114 may activate security at the RAN level by running an initial security activation procedure, and deriving the keys $K_{RRCint}$ 144, $K_{RRCenc}$ 146 and $K_{UPenc}$ 148. Upon receipt of the message security command, the UE 118 may also derive the same set of keys $K_{RRCint}$ 144, $K_{RRCenc}$ 146 and $K_{UPenc}$ 148 using a locally generated version of $K_{eNB}$ 113. In this example, the UE 118 may respond to the eNB 114 with the message security mode complete that may be integrity protected using the key $K_{RRCint}$ 144 but that may not be ciphered. In this example, a secure signalling connection may now have been established at the RAN level plus ciphering may have been established for user plane bearers. In FIG. 1, the secure signalling connections are shown as dashed lines between the peer EIA 132 and EEA 134 entities.

In summary, the abovementioned procedure relies on a close interaction between the UE 118 and the network. The permanent key 'K' 108 is only stored in the HSS 102 and USIM of the UE 118, and is never transmitted anywhere else in the network. This is to preserve the shared 'secret'. All the keys disclosed in FIG. 2 are derived from permanent K 108 and the algorithms for deriving network keys are common across all network elements, including the UE 118. Generally, the EPS AKA, key hierarchy and procedure for activating keys requires interaction between the UE 118 and other network elements.

In some instances, it may be advantageous for two or more UEs to communicate directly without the use of the abovementioned network structure. This may be, for example, when the two or more UEs desiring communication are outside of the radio coverage provided by the network infrastructure. An example application for direct mode operation (DMO) could be for the public safety market.

However, implementing direct mode operation using the abovementioned architecture is not currently possible, due, in part, to the use of the permanent key 'K' in the art. It has already been discussed that the permanent key 'K' is only stored in the USIM of a UE and the AuC of a HSS. Therefore, the currently defined architecture cannot be utilised for DMO. For example, utilising the abovementioned architecture, a UE desiring DMO would need to store the permanent keys for all UEs that it may have a DMO communication with, which is unfeasible. Further, the transmission of the permanent key 'K' to other UEs could compromise security of the network, as the permanent key 'K', currently, is never transmitted over the network. Further, if a UE is not connected to the network, there is currently no way for this UE to determine the key hierarchy defined in FIG. 2.

Therefore, there is a need to provide DMO authenticated and secure communications between UEs, utilising the current abovementioned architecture, whilst overcoming the problem of utilising a permanent key 'K' that cannot be transmitted through the network.

SUMMARY OF THE INVENTION

Example embodiments of the invention describe a terminal device arranged to communicate with a wireless communications system and method therefor.

A method for key generation at a terminal device supporting at least two communication modes of operation is described. The method comprises, at a terminal device comprising a key derivation function: receiving at least one input parameter from a first wireless communication system; generating a first key in the key derivation function using the received at least one input parameter and at least one first locally stored input parameter in order to transmit in a first mode of operation on the first wireless communication system; and generating a second key in the key derivation function solely using at least one second locally stored input parameter in order to transmit in a second mode of operation on a second wireless communication system; wherein the at least one second locally stored input parameter is arranged to enable the second key to be used as the first key.

In some examples, a terminal device comprises a receiver arranged to receive at least one input parameter from a first wireless communication system. A control processor (which may be in a form of integrated circuit) comprises a key derivation function operably coupled to the receiver and arranged to: generate a first key using the received at least one input parameter and at least one first locally stored input parameter in order to transmit in a first mode of operation on the first wireless communication system; generate a second key solely using at least one second locally generated stored input parameter, wherein the at least one second locally stored input parameter is arranged to enable the second key to be used as the first key; and transmit subsequently in the second mode of operation on a second wireless communication system In some examples, the terminal device may comprise a receiver arranged to receive authentication information from the wireless communications system; a transmitter arranged to transmit authentication information to the wireless communication system; and a control processor operably coupled to the receiver and arranged to: process received authentication information; determine whether a DMO mode or EPS AKA mode of operation is required; derive either EPS authentication parameters or DMO key generation parameters based on the above determination; and transmit subsequently a response to the wireless communications system.

In some examples, the terminal device's mode of operation may be determined by the current network coverage. In some examples, the terminal device may utilise a DMO mode of operation if located outside of the current network. In some examples, implicit authorisation may be utilised by the terminal device when in DMO mode. In some examples, preconfigured DMO values may be substituted for EPS AKA values when the terminal device is operating in DMO mode for determining KASME.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 3:
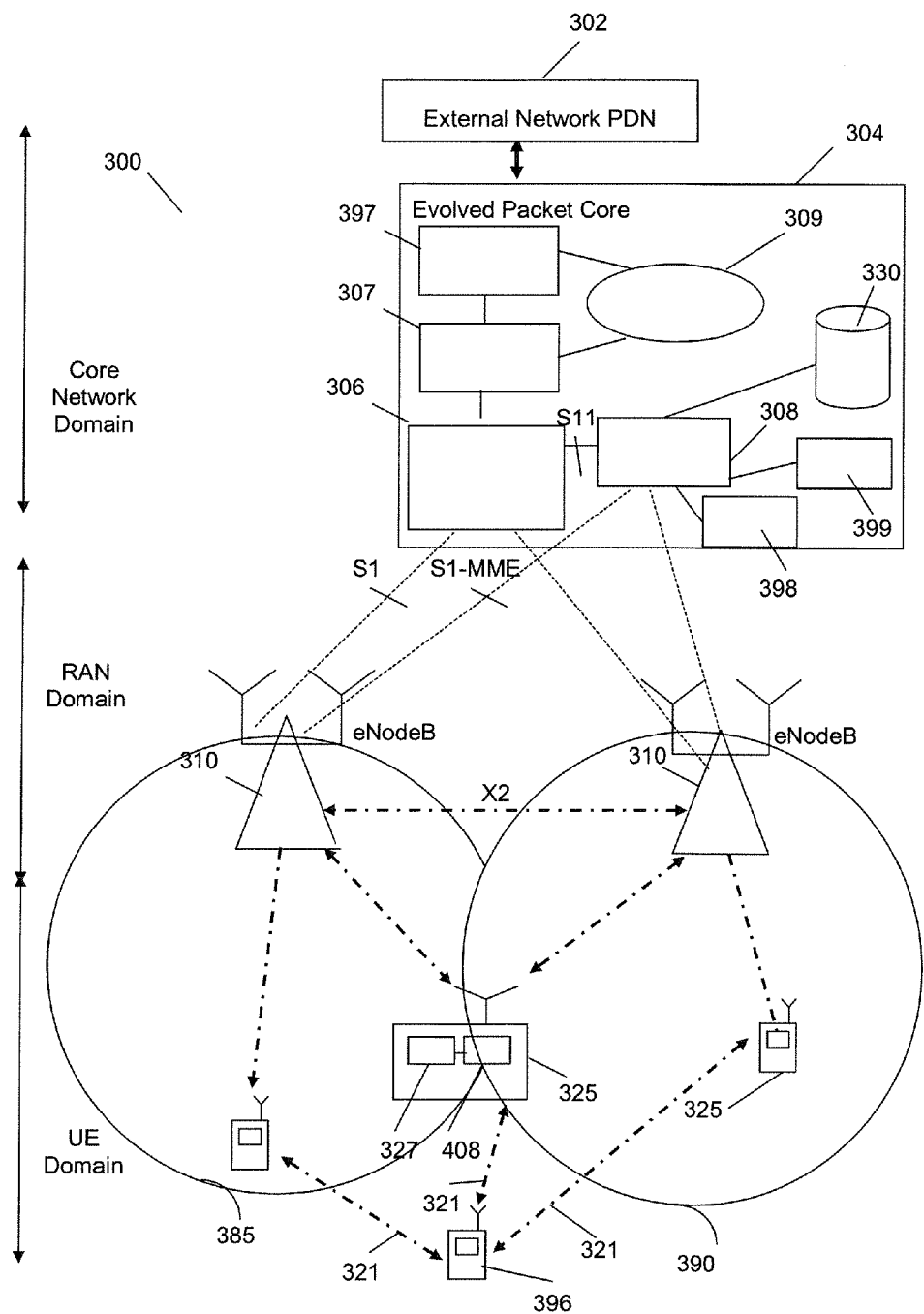
FIG. 3 illustrates a 3GPP™ LTE cellular communication system adapted in accordance with some example embodiments of the present invention.

Referring now to FIG. 3, a wireless communication system 300 is shown in outline, in accordance with one example embodiment of the invention. In this example embodiment, the wireless communication system 300 is compliant with, and contains network elements capable of operating over, a universal mobile telecommunication system (UMTS™) airinterface. In particular, the embodiment relates to a system's architecture for an Evolved-UMTS Terrestrial Radio Access Network (E-UTRAN) wireless communication system, which is currently under discussion in the third Generation Partnership Project (3GPP™) specification for long term evolution (LTE), based around OFDMA (Orthogonal Frequency Division Multiple Access) in the downlink (DL) and SC-FDMA (Single Carrier Frequency Division Multiple Access) in the uplink (UL), as described in the 3GPP™ TS 36.xxx series of specifications. Within LTE, both time division duplex (TDD) and frequency division duplex (FDD) modes are defined.

The wireless communication system 300 architecture consists of radio access network (RAN) and core network (CN) elements 304, with the core network elements 304 being coupled to external networks 302 (named Packet Data Networks (PDNs)), such as the Internet or a corporate network. The CN elements 304 comprise a packet data network gateway (P-GW) 307. In order to serve up local content, the P-GW may be coupled to a content provider. The P-GW 307 may be further coupled to a policy control and rules function entity (PCRF) 397 and a Gateway 306.

The PCRF 397 is operable to control policy control decision making, as well as for controlling the flow-based charging functionalities in a policy control enforcement function PCEF (not shown) that may reside in the P-GW 307. The PCRF 397 may further provide a quality of service (QoS) authorisation class identifier and bit rate information that dictates how a certain data flow will be treated in the PCEF, and ensures that this is in accordance with a UE's 325 subscription profile.

In example embodiments, the Gateway 306 is a Serving Gateway (S-GW). The Gateway 306 is coupled to a mobility management entity MME 308 via an S11 interface. The MME 308 is operable to manage session control of Gateway bearers and is operably coupled to a home subscriber server (HSS) database 330 that is arranged to store subscriber communication unit 325 (user equipment (UE)) related information. As illustrated, the MME 308 also has a direct connection to each eNodeB 310, via an S1-MME interface.

The HSS database 330 may store UE subscription data such as QoS profiles and any access restrictions for roaming. The HSS database 330 may also store information relating to the P-GW 307 to which a UE 325 can connect. For example, this data may be in the form of an access point name (APN) or a packet data network (PDN) address. In addition, the HSS database 330 may hold dynamic information relating to the identity of the MME 308 to which a UE 325 is currently connected or registered.

The MME 308 may be further operable to control protocols running between the user equipment (UE) 325 and the CN elements 304, which are commonly known as Non-Access Stratum (NAS) protocols. The MME 308 may support at least the following functions that can be classified as: functions relating to bearer management (which may include the establishment, maintenance and release of bearers), functions relating to connection management (which may include the establishment of the connection and security between the network and the UE 325) and functions relating to interworking with other networks (which may include the handover of voice calls to legacy networks). The Gateway 306 predominantly acts as a mobility anchor point and is capable of providing internet protocol (IP) multicast distribution of user plane data to eNodeBs 310. The Gateway 306 may receive content via the P-GW 307, from one or more content providers 309 or via the external PDN 302. The MME 308 may be further coupled to an evolved serving mobile location center (E-SMLC) 398 and a gateway mobile location center (GMLC) 399.

The E-SMLC 398 is operable to manage the overall coordination and scheduling of resources required to find the location of the UE that is attached to the RAN, in this example embodiment the E-UTRAN. The GMLC 399 contains functionalities required to support location services (LCS). After performing an authorisation, it sends positioning requests to the MME 308 and receives final location estimates.

The P-GW 307 is operable to determine IP address allocation for a UE 325, as well as QoS enforcement and flow-based charging according to rules received from the PCRF 397. The P-GW 307 is further operable to control the filtering of downlink user IP packets into different QoS-based bearers (not shown). The P-GW 307 may also serve as a mobility anchor for inter-working with non-3GPP technologies such as CDMA2000 and WiMAX networks.

As the Gateway 306 comprises an S-GW, the eNodeBs 310 would be connected to the S-GW 306 and the MME 308 directly. In this case, all UE packets would be transferred through the S-GW 306, which may serve as a local mobility anchor for the data bearers when a UE 325 moves between eNodeBs 310. The S-GW 306 is also capable of retaining information about the bearers when the UE 325 is in an idle state (known as EPS connection management IDLE), and temporarily buffers downlink data while the MME 308 initiates paging of the UE 325 to re-establish the bearers. In addition, the S-GW 306 may perform some administrative functions in the visited network, such as collecting information for charging (i.e. the volume of data sent or received from the UE 325). The S-GW 306 may further serve as a mobility anchor for inter-working with other 3GPP™ technologies such as GPRS™ and UMTS™.

As illustrated, the CN 304 is operably connected to two eNodeBs 310, with their respective coverage zones or cells 385, 390 and a plurality of UEs 325 receiving transmissions from the CN 304 via the eNodeBs 310. In accordance with example embodiments of the present invention, at least one eNodeB 310 and at least one UE 325 (amongst other elements) have been adapted to support the concepts hereinafter described.

The main component of the RAN is an eNodeB (an evolved NodeB) 310, which performs many standard base station functions and is connected to the CN 304 via an S1 interface and to the UEs 325 via a Uu interface. A wireless communication system will typically have a large number of such infrastructure elements where, for clarity purposes, only a limited number are shown in FIG. 3. The eNodeBs 310 control and manage the radio resource related functions for a plurality of wireless subscriber communication units/terminals (or user equipment (UE) 325 in UMTS™ nomenclature). Each of the UEs 325 comprise a transceiver unit 327 operably coupled to signal processing logic 408 (with one UE illustrated in such detail for clarity purposes only). The system comprises many other UEs 325 and eNodeBs 310, which for clarity purposes are not shown.

In some examples, one or more (with one UE illustrated for clarity purposes) UEs 396 may be outside of the coverage zones or cells 385 of eNodeBs 310. In these examples, it may be advantageous for the UE to utilise Direct Mode Operation (DMO), to allow the UE 396 to communicate directly 321 with another UE, for example UE(s) 325, without the use of the network infrastructure. In some examples, the UE 396 may communicate 321 with at least one further UE that may be outside the coverage zone (not shown) or cells 385 of the network infrastructure. In other examples, the UE 396 may communicate 321 with at least one further UE 325 that may be inside the coverage zone or cells.

Clearly, the various components within the eNodeB 310 can be realized in discrete or integrated component form, with an ultimate structure therefore being an application-specific or design selection.

Figure 4:
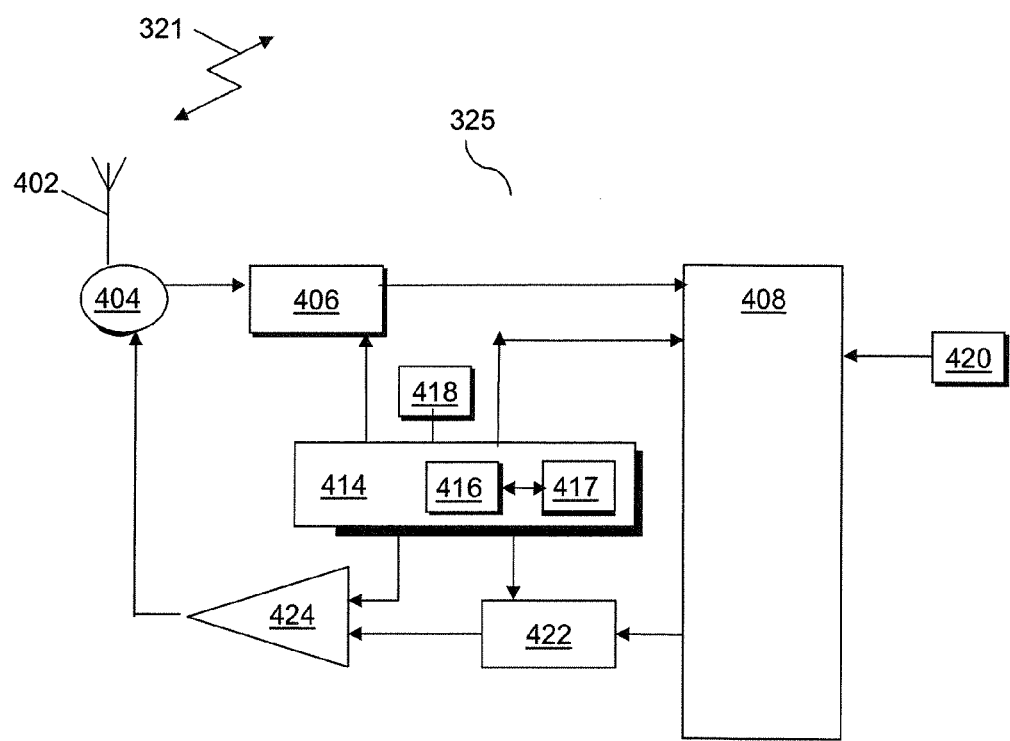
FIG. 4 illustrates a wireless communication unit adapted in accordance with some example embodiments of the present invention.

Referring now to FIG. 4, a block diagram of a wireless communication unit, adapted in accordance with some example embodiments of the invention, is shown. In practice, purely for the purposes of explaining embodiments of the invention, the wireless communication unit is described in terms of a wireless subscriber communication unit, such as a UE 325/396. The wireless communication unit 325/396 contains an antenna 402, for receiving transmissions 321, coupled to an antenna switch or duplexer 404 that provides isolation between receive and transmit chains within the wireless communication unit 325/396. One or more receiver chains, as known in the art, include receiver front-end circuitry 406 (effectively providing reception, filtering and intermediate or base-band frequency conversion). The receiver front-end circuitry 406 is coupled to a signal processing module 408 (generally realized by a digital signal processor (DSP)). A skilled artisan will appreciate that the level of integration of receiver circuits or components may be, in some instances, implementation-dependent.

The controller 414 maintains overall operational control of the wireless communication unit 325/396. The controller 414 is also coupled to the receiver front-end circuitry 406 and the signal processing module 408. In some examples, the controller 414 is also coupled to a buffer module 417 and a memory device 416 that selectively stores operating regimes, such as decoding/encoding functions, synchronization patterns, code sequences, and the like. A timer 418 is operably coupled to the controller 414 to control the timing of operations (e.g. transmission or reception of time-dependent signals) within the wireless communication unit 325/396.

As regards the transmit chain, this essentially includes an input module 420, coupled in series through transmitter/modulation circuitry 422 and a power amplifier 424 to the antenna 402, antenna array, or plurality of antennas. The transmitter/modulation circuitry 422 and the power amplifier 424 are operationally responsive to the controller 414.

The signal processor module 408 in the transmit chain may be implemented as distinct from the signal processor in the receive chain. Alternatively, a single processor may be used to implement a processing of both transmit and receive signals, as shown in FIG. 4. Clearly, the various components within the wireless communication unit 325/396 can be realized in discrete or integrated component form, with an ultimate structure therefore being an application-specific or design selection.

Figure 5:
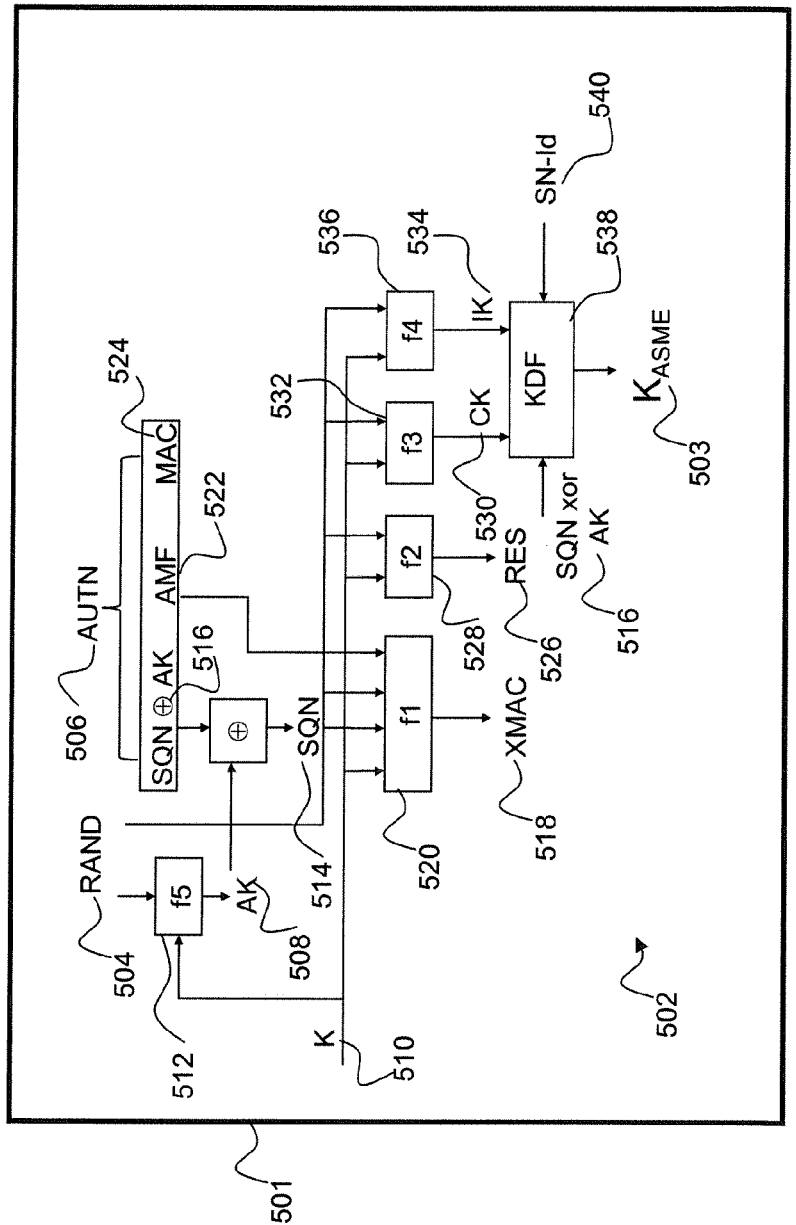
FIG. 5 illustrates a simplified block diagram of a USIM as defined in the art.

Referring now to FIG. 5, an example block diagram of a User Subscriber Identity Module for deriving $K_{ASME}$ 503, is shown. The general operation of FIG. 5 is known in the art, however, a general overview of its operation will be given prior to discussing aspects of the invention. In this example, USIM 502 may be situated within a UE 501. In this example, RAND 504 and AUTN 506 may be sent to the UE 501 as part of the AKA procedure, discussed above. Upon receipt of RAND 504 and AUTN 506, the USIM 502 may determine the anonymity key (AK) 508, which, in this example, may be based on permanent key 'K' 510, algorithm f5 512 and RAND 504. In this example, the algorithms f1-f5 may be determined by the operator of the USIMs and AuC/HSS, however, as an example, a set of algorithms called MILENAGE may be used.

In this example, the anonymity key may be utilised to conceal the sequence number (SQN) in case the identity and location of a user may be exposed. For example, for no concealment, AK=0 and f5=0. In this example, the USIM 502 may subsequently retrieve a sequence number SQN 514, which may be based on SQN, where SQN is equal to SQN⊕AK 516, from AUTN 506, ⊕AK 508, wherein ⊕, in this example, relates to an 'exclusive or' function. In this example, the USIM 502 may next compute XMAC 518, which may be based on algorithm f1 520, permanent key 'K' 510, SQN 514, RAND 504 and AMF 522. In this example, AMF 522 may be an Authentication Management Field.

In this example, the USIM 502 may compare XMAC 518 with MAC 524 that may be included in AUTN 506. If XMAC 518 and MAC 524 are different, the USIM 502 may transmit a reject message back through the network, otherwise, the USIM 502 may accept the authentication. In some examples, the USIM 502 may verify the freshness of the received sequence number SQN 514. In some examples, if the sequence number SQN 514 is considered fresh, the USIM 502 may determine RES 526, which, in this example, may be based on algorithm f2 528, permanent key 'K' 510 and RAND 504. In some examples, RES 526 may be transmitted back through the network to allow verification of authentication, for example, by comparing RES 526 with an expected response.

In examples, the USIM 502 may further determine cipher key CK 530, which may be based on algorithm f3 532, permanent key 'K' 510 and RAND 504, and integrity key IK 534, which may be based on algorithm f4 536, permanent key 'K' 510 and RAND 504. In this example, $K_{ASME}$ 503, the key for access security management entity that is used by, for example, the MME to derive further keys, may be generated by the key derivation function 538. In this example, key derivation function 538 determines $K_{ASME}$ 503 based on at least cipher key CK 530, integrity key IK 534, SQN xor AK 516 and SN-Id 540, where SN-Id 540 may be a serving network identity.

As discussed previously, it may be advantageous for UEs to utilise direct mode operations between each other. This may be, for example, when UEs desiring communication are outside of a radio coverage zone provided by a network infrastructure. However, since there is no infrastructure in DMO, it is not possible to reuse the abovementioned systems in their entirety. Furthermore, there is no notion of mutual authentication between a network and a UE, as in current LTE systems.

A potential solution may be to utilise implicit authentication rather than mutual authentication, which may result in DMO UEs utilising an agreed set of keys that are shared for DMO communications. However, in order to utilise current EPS security architecture, for example for generating further keys in the key hierarchy, it may be necessary for DMO UEs to be compatible with at least parts of the current EPS key hierarchy.

Figure 6:
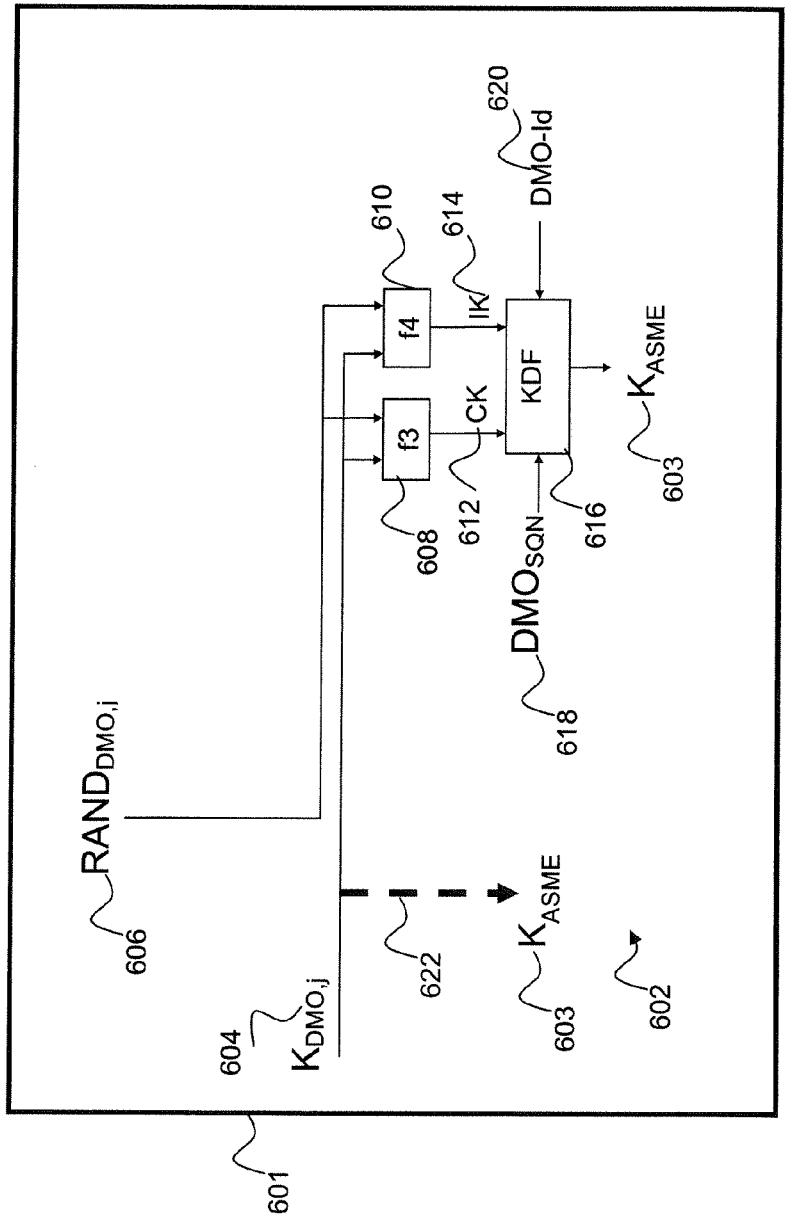
FIG. 6 illustrates a simplified block diagram of a USIM adapted in accordance with some example embodiments of the present invention.

Referring now to FIG. 6, a simplified block diagram of a modified Universal Subscriber Identity Module (USIM) for deriving $K_{ASME}$ 603, adapted in accordance with some example embodiments of the invention is shown. In this example, USIM 602 may be situated within a UE 601. In this example, implicit authentication may be utilised, which may result in DMO UEs utilising an agreed set of keys that they share for communications. In some examples, only the DMO UEs utilise these shared keys, and, in some instances, these shared keys may be refreshed either manually or automatically. In some examples, the keys may be refreshed regularly. In examples, the shared keys may be stored on the USIM. In other examples, the shared keys may be stored in any other suitable storage facility on the UE 601 such as a memory or CPU.

In this example, the agreed set of keys referred to above may embody at least one preconfigured DMO shared key. In this example, the at least one preconfigured DMO shared key may be utilised to replace, for example, permanent key 'K' 510 from FIG. 5 when in DMO mode. In this example, the preconfigured DMO shared key is referred to as $K_{DMOj}$ 604, where j=0 to n−1 and n is equal to the number of keys. In this example, n>1. In some examples, it may be necessary to utilise more than one preconfigured DMO shared key, for example, at least one preconfigured DMO shared key for point-to-point communications, and at least one preconfigured DMO shared key for group communications. For example, if there is a group call, the group address may be known as part of the call setup procedure. In this example, then the DMO UE may be able to advantageously use blind decoding. In other examples, one preconfigured DMO shared key may be utilised for both point-to-point communications and group communications. In some examples, a unique preconfigured DMO shared key may be utilised if operating in group communications mode.

In contrast to known key generation techniques for LTE that use two keys (one from the Core Network generated by the MME and one from the access network generated by the eNodeB) some examples employ a single same seed key for use by both DMO UEs. In some examples, one or more additional seed key may be used for, say, DMO group calling or an additional seed key may be used by different services, e.g. Police, Fire Services, Ambulance, etc.

As discussed above, the EPS security architecture relies on network interaction between at least a UE and HSS, MME etc. for authentication. This procedure cannot be carried out if utilising DMO and, therefore, there is a need to provide a solution to overcoming a potential issue of no network interaction if utilising DMO.

In this example, there are many modes of operation that can be utilised to generate $K_{ASME}$ 603. In this example, a DMO random number or DMO random challenge ($RAND_{DMOj}$) 606 may be received by USIM 602, for example, via another DMO UE (not shown) that may be passed to algorithms f3 608 and f4 610. In this example, UEs involved in DMO utilise preconfigured shared key $K_{DMOj}$ 604, which, in this example, comprise a single key used for point-to-point communications, therefore $K_{DMOj}$ is known for all DMO UEs. In some examples, DMO UEs utilising more than one preconfigured shared key, may receive details of which preconfigured shared key to utilise during part of a call setup procedure. In this example, it should be noted that $K_{DMOj}$ 604 is not transmitted between DMO UEs. In this example, $K_{DMOj}$ 604 and $Rand_{DMOj}$ 606 may be utilised by algorithms f3 608 and f4 610 to generate a cipher key CK 612 and an integrity key IK 614, which may be received by key derivation function (KDF) module 616. In this example, KDF module 616 may determine $K_{ASME}$ 603 based on CK 612, IK 614, $DMO_{SQN}$ 618 and DMO-Id 620.

In some examples, the KDF may be advantageously reused. In this example, $DMO_{SQN}$ 618 and DMO-Id 620 may be received by USIM 602 via another DMO UE (not shown). In this example, the USIM 602 may replace previously received network values from FIG. 5, for example, RAND 504, K 510, SQN xor AK 516 and SN-Id, with DMO equivalent values, for example, $K_{DMOj}$ 604, $RAND_{DMOj}$ 606, $DMO_{SQN}$ 618 and DMO-Id 620.

In some examples, the abovementioned DMO equivalent values/security parameters may be signalled to the USIM 602 over the network. For example, if the DMO UE is within network coverage, the DMO UE may receive information relating to the DMO equivalent values. In some examples, the information relating to DMO equivalent values may be updated on a regular basis. In other examples, the information relating to DMO equivalent values may be updated periodically, for example on a daily basis.

In other examples, the DMO UE may not be within network coverage for a prolonged period of time. Therefore, the DMO UE may not be able to receive information from the network. In some examples, therefore, the DMO UE may receive information relating to DMO equivalent values from a database, or the like, for example a central database. In some examples, the DMO UE may connect to the central database on a regular basis. In other examples, the DMO UE may connect to the database periodically.

In some examples, the DMO UE may be stored when not in use, for example overnight, in a synchronisation device, such as a cradle. In some examples, the synchronisation device may be utilised to allow the DMO UE to receive information relating to DMO equivalent values that may be stored on the database. In some examples, the information relating to DMO equivalent values may be determined by an office manager, for example, over an internal IT network, for example, and therein stored on the database. In some examples, DMO UEs may automatically synchronise with the database when stored in a synchronisation device. In examples, the synchronisation device may determine whether synchronisation takes place. In other examples, the DMO UEs may determine whether synchronisation takes place. In other examples, synchronisation may be manually determined. In further examples, synchronisation may take place wirelessly, for example, when the DMO UE is within the internal IT network's range.

In other examples, a combination of network signalling and synchronisation over an internal IT network may be utilised.

In some examples, where a DMO UE may not have any network coverage, DMO equivalent values may be set-up prior to the DMO UE device being utilised. Therefore, the DMO UE may be operable to receive DMO communications from other DMO UEs utilising current DMO equivalent values.

In some examples, the DMO UE may be stored by an operator after completing a day/night shift. The DMO UE may be stored in a synchronisation device that may charge the DMO UE and upload new DMO equivalent values to the DMO UE. In some examples, uploading and charging may occur during DMO UE downtime. In some examples, synchronisation may be determined by the synchronisation device. In other examples, synchronisation may be determined by the DMO UE or the DMO UE operator.

In some examples, a 'trigger' may be utilised to inform the USIM that a particular mode of operation is to be used. This 'trigger' may comprise a separate message transmitted between DMO UEs, or an integral message sent with, for example the DMO-Id 620. In other examples, the 'trigger' may be transited to the DMO UE by the network. In other examples, the 'trigger' may be a decision by the DMO UE to engage in DMO communications. This may be advantageous if the DMO UE wishes to communicate when not in network coverage.

In examples, the $K_{DMO,j}$ bit size may be roughly in the range of 128 bits to 256 bits. Further, in examples, the $RAND_{DMO,j}$ bit size may be roughly in the range of 0 bits to 128 bits. In further examples, the DMO-Id bit size may be roughly in the range of 0 bits to 24 bits. In further examples, the $DMO_{SQN}$ bit size may be roughly in the range of 0 bits to 48 bits.

In examples, the USIM 602 may select a correct $K_{DMO,j}$ from a series of preconfigured keys, wherein the selection may be determined by the network. In this example, where the preconfigured key to be utilised is determined by the network from a series of available preconfigured keys, the network may inform the USIM 602 which preconfigured key to utilise.

In some examples, the series of preconfigured keys may be stored on the USIM 602. In other examples, the series of preconfigured keys may be stored in any other suitable storage facility on the UE 601 such as a memory or CPU.

In some examples, the USIM 602 may select a correct $K_{DMO,j}$ from a series of preconfigured keys, wherein the selection may not be determined by the network, for example when the UE 601 may be outside of any network coverage. In some examples, the DMO UE may determine the correct $K_{DMO,j}$ to utilise based on information received from other devices inside or outside of network coverage, for example another DMO UE. In other examples, the DMO UE may determine $K_{DMO,j}$ without any external interaction. This may be, for example, if the DMO UE initialises DMO communications with another device inside or outside of network coverage.

In other examples, the USIM 602 may utilise $K_{DMO,j}$, which may have been uploaded to USIM 602 previously, in order to initiate DMO communications with another device inside or outside of network coverage. In this example, there may be a single $K_{DMO,j}$ and, therefore, the 'correct' key may not need to be determined by USIM 602, or need to be signalled to the USIM 602 via the network.

In another example, the DMO-Id 620 may be replaced with the identity of the serving network (SN-Id), which is the same as the visited PLMN-Id (Public Land Mobile Network Id), which would detail the users that are engaged in DMO communications. This may occur, for example, in a non-roaming case, as roaming users may have a problem in obtaining this information. As discussed above, the relevant DMO UEs may receive a 'trigger' to inform the DMO UEs that a particular mode of operation is to be utilised, in this example, a non roaming mode of operation. In examples, the 'trigger' may be provided by the network. In other examples, the 'trigger' may be a decision by the DMO UE, which may not be in network coverage, to engage in DMO communications.

In another example, the preconfigured shared key, $K_{DMO,j}$ 604 may be equivalent to $K_{ASME}$ 603, referred to as dashed line 622. In another example, $K_{ASME}$ may be replaced with $K_{DMO,j}$ (i.e. $K_{DMO,j}=K_{ASME}$). In these examples, it may not be necessary to set $RAND_{DMO,j}$ 606, $DMO_{SQN}$ 618 and DMO-Id 620 to determine $K_{ASME}$, thereby reducing the complexity of determining $K_{ASME}$ 603 in some examples. In other examples, the preconfigured shared key may comprise a plurality of shared keys, $K_{DMO,j}$ 604, whereby one of the plurality of shared keys may be equivalent to $K_{ASME}$ 603.

Figure 1:
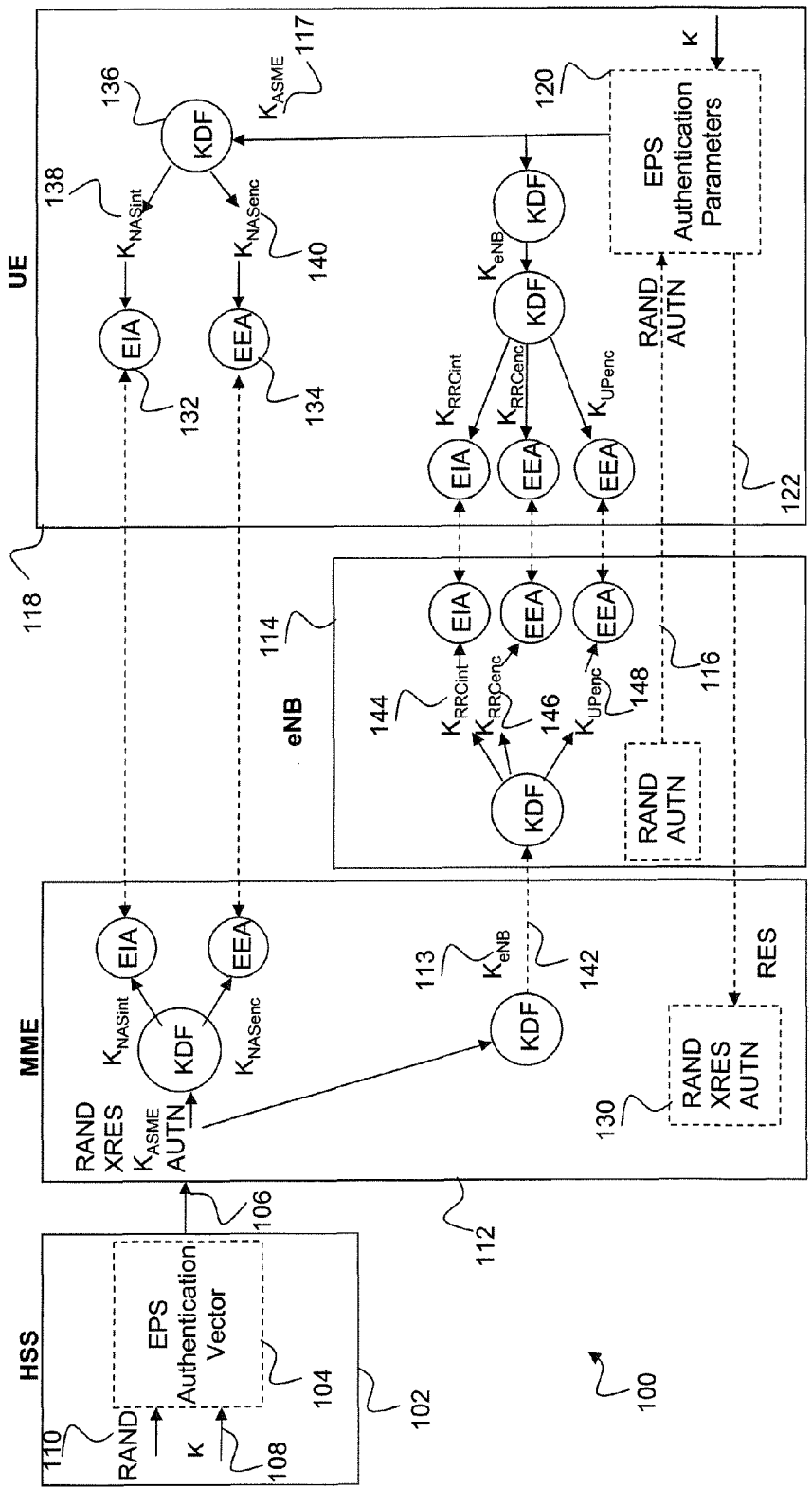
FIG. 1 illustrates a simplified diagram of EPS security architecture as defined in the art.
Figure 2:
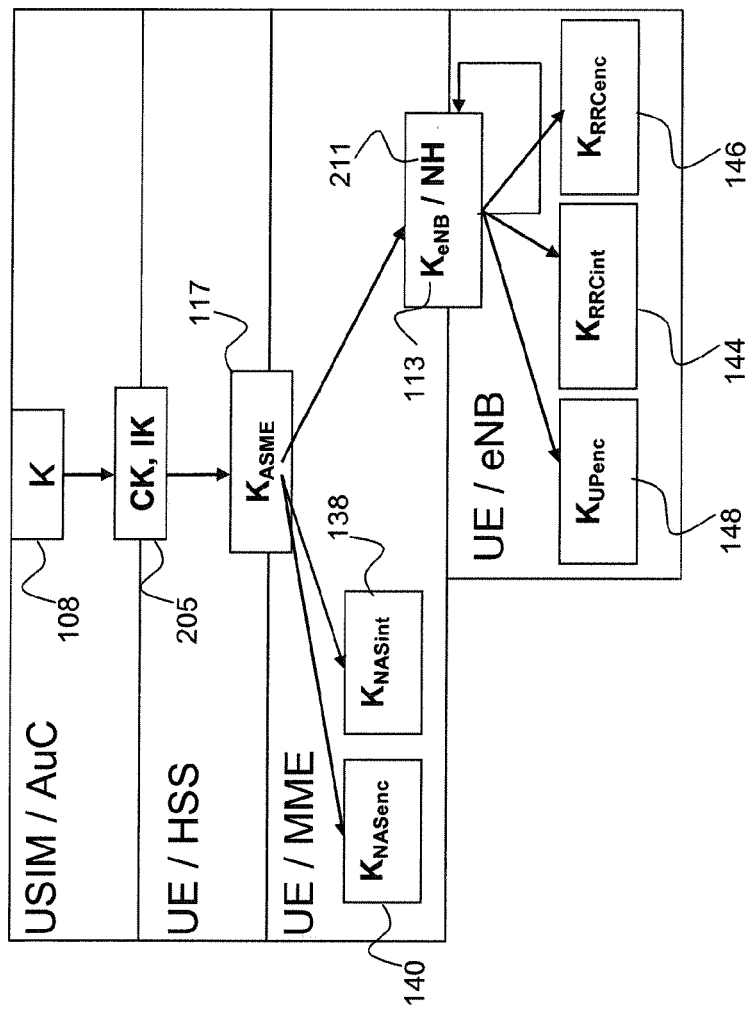
FIG. 2 illustrates a simplified diagram of EPS key hierarchy as defined in the art.

In examples, aspects of the invention may be utilised to produce all, or a proportion of, the EPS key hierarchy illustrated in FIG. 2.

The abovementioned examples may be used singularly or in conjunction with each other.

In another example, $K_{DMO,j}$ 604 may be utilised for deriving $K_{ASME}$ 603 by bypassing algorithms f3 608 and f4 610. Therefore, in this example, KDF module 616 may determine $K_{ASME}$ 603 based on $K_{DMO,j}$ 604 and for example, a suitable bit string of a suitable length. In examples, the suitable bit string may be random. In further examples, the suitable bit string may match the length of SN-id 540 and SQN xor AK 516.

Aspects of the invention may support the use of Direct Mode Operation within a known EPS security architecture, allowing USIM architecture, currently utilised for LTE operation, to be utilised for DMO communications between a plurality of UEs. Thereby providing a DMO solution, whilst minimising changes to current UE architecture and network architecture.

Figure 7:
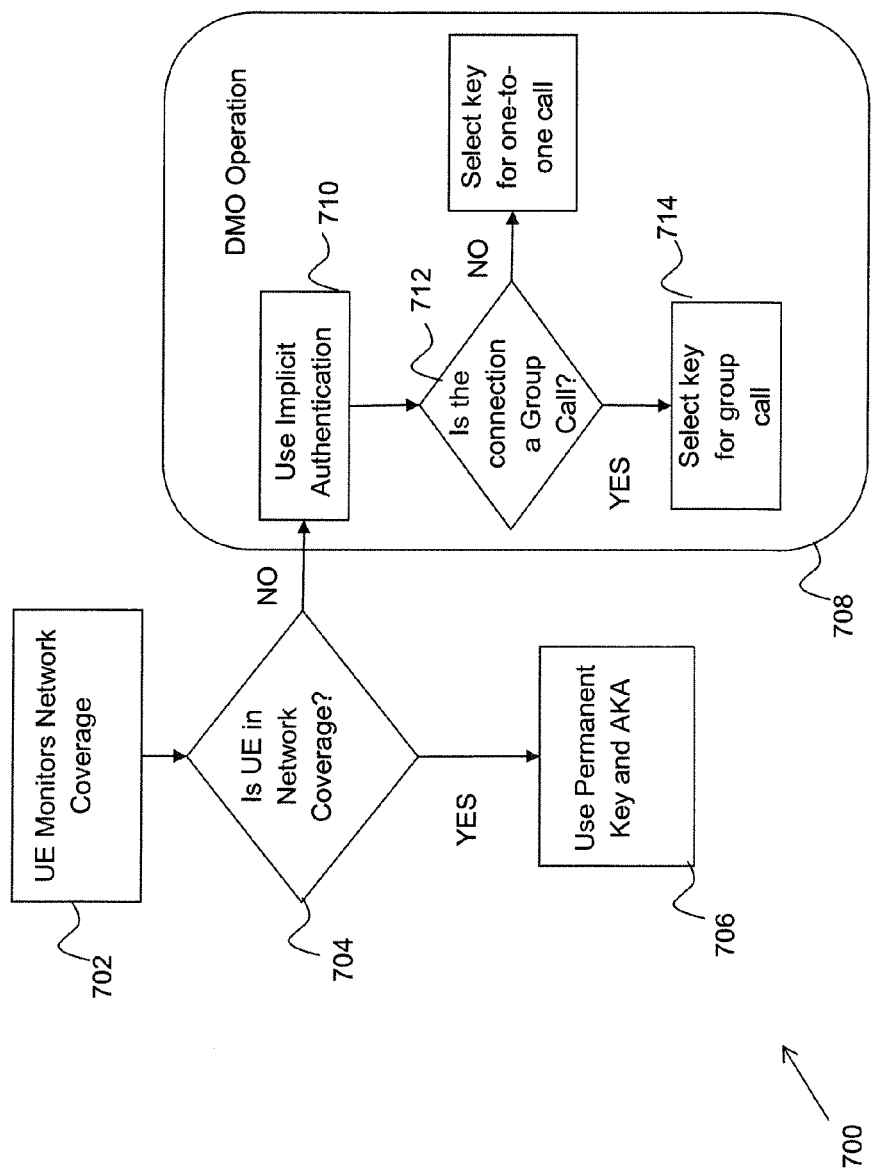
FIG. 7 illustrates an example of a simplified flow chart illustrating UE key selection in accordance with some embodiments of the present invention.

Referring now to FIG. 7, an example of a simplified flow chart illustrating UE key selection 700 is shown. Initially, at 702, a UE with DMO capability monitors its current network coverage. In this example, at 704, the UE may determine whether it is currently within the coverage of the current network. In some examples, the UE may determine step 704 periodically. In other examples, the DMO UE may determine step 704 based on an external trigger from the network. If the UE determines, at step 704, that it is within the current network coverage and a call has been initiated, the UE utilises permanent Key K and current evolved packet system authentication and key agreement protocol 706 as currently defined in the art. If the UE determines that it is not in the current network coverage and a connection to another UE is to be initiated, it may initiate its DMO operation 708. At step 710, the UE may initialise implicit authentication, wherein the UE accesses its stored agreed set of keys that are utilised for DMO communications. In examples, the UE may select one or more of the agreed set of keys based on a previous message from the network. In other examples, the UE may select one or more of the agreed set of keys based on a pre-configured set-up. For example, this preconfigured set-up may have been determined during a synchronisation phase, while, for example, the UE was not being utilised. Further, in some examples, the UE may select one or more of the agreed set of keys based on a determination of received information from other UEs that may or may not be in network coverage. Therefore, in some examples, the selection of one or more agreed set of keys may be determined by other UEs, which may or may not be in network coverage.

At step 712, the UE may determine whether the connection to be established is a group call or a one-to-one call. If the UE determines that the connection to be established is a group call, the UE may select parameters or key(s) associated with the group 714. Otherwise, if the UE determines that the connection to be established is a one-to-one call, the UE may select parameters or key(s) associated with the one-to-one call. In this example, one or more DMO equivalent parameters may be utilised, as discussed in relation to FIG. 6. In examples, the selection of parameters or key(s) may be determined by a previous instruction from the network, by instruction from another UE or a pre-configured set-up, as discussed above.

In some examples, UEs may be set-up with a single pre-configured key for each mode of operation. In this example, once the UE has determined the call type, the UE may simply select the single pre-configured key for a particular mode of operation. This pre-configured key may be the same for all UEs using this mode of operation. In examples, the pre-configured keys may be uploaded to the UEs during a synchronisation phase as discussed above. In this example, UE operation may be simplified as UEs do not need to determine which key to use based on information received from the network or other UEs. In this example, UEs may only need to determine the call type, and, therefore, key selection may be enabling the single key associated with the particular call type.

Figure 8:
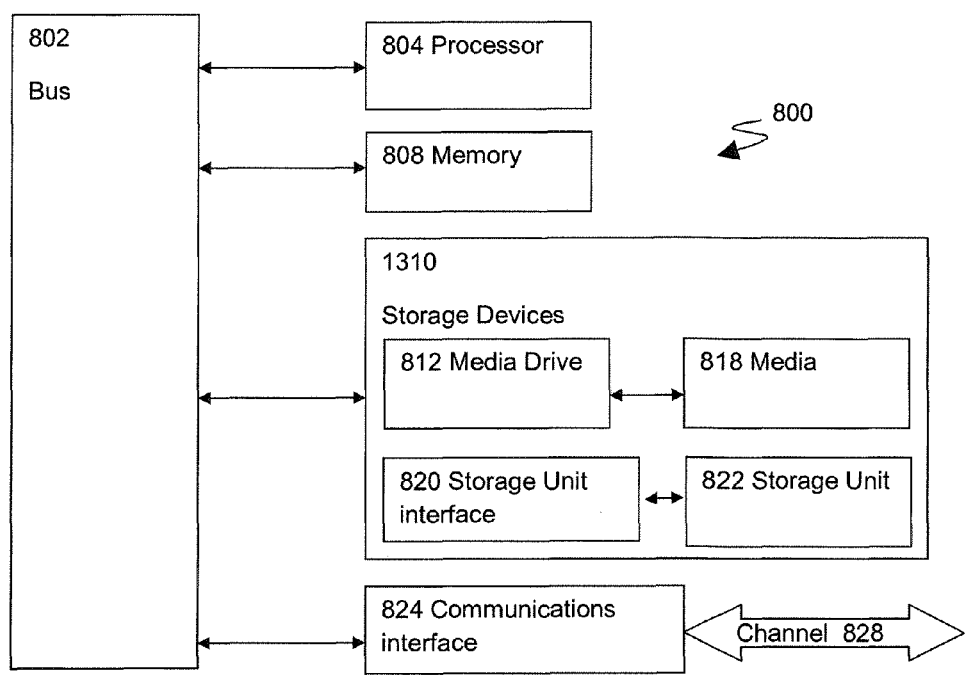
FIG. 8 illustrates a typical computing system that may be employed to implement software controlled switching between Direct Mode Operation and current EPS AKA operation in embodiments of the invention.

Referring now to FIG. 8, there is illustrated a typical computing system 800 that may be employed to implement software controlled switching between Direct Mode Operation and current EPS AKA operation in embodiments of the invention. Computing systems of this type may be used in wireless communication units, such as first or second wireless network elements. Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special-purpose processing engine such as, for example, a microprocessor, microcontroller or other control logic. In this example, processor 804 is connected to a bus 802 or other communications medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory (ROM) or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 818 may include, for example, a hard disk, floppy disk, magnetic tape, optical disk, CD or DVD, or other fixed or removable medium that is read by and written to by media drive 812. As these examples illustrate, the storage media 1318 may include a computer-readable storage medium having particular computer software or data stored therein.

In alternative embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a universal serial bus (USB) port), a PCMCIA slot and card, etc. Software and data transferred via communications interface 824 are in the form of signals which can be electronic, electromagnetic, and optical or other signals capable of being received by communications interface 824. These signals are provided to communications interface 824 via a channel 828. This channel 828 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to media such as, for example, memory 808, storage device 818, or storage unit 822. These and other forms of computer-readable media may store one or more instructions for use by processor 804, to cause the processor to perform specified operations. Such instructions, generally referred to as 'computer program code' (which may be grouped in the form of computer programs or other groupings), when executed, enable the computing system 800 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, removable storage drive 822, drive 812 or communications interface 824. The control logic (in this example, software instructions or computer program code), when executed by the processor 804, causes the processor 804 to perform the functions of the invention as described herein.

In one example, a tangible non-transitory computer program product comprises executable program code operable for, when executed at a UE that has DMO capability: determining current network coverage and whether a call is to be initiated; determining whether permanent key and EPS AKA should be utilised, or whether DMO operation should be utilised; if DMO operation is to be utilised, whether the connection with another UE is a one-to-one connection or a group connection; and utilising appropriate parameters or key(s) for the one-to-one or group connection.

It will be further appreciated that, for clarity purposes, the described embodiments of the invention with reference to different functional units and processors may be modified or re-configured with any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. For example, the software may reside on non-transitory computer program product comprising executable program code to increase coverage in a wireless communication system.

In one example, the program code may be operable for, at a UE that has DMO capability: determining current network coverage and whether a call is to be initiated; determining whether permanent key and EPS AKA should be utilised, or whether DMO operation should be utilised; if DMO operation is to be utilised, whether the connection with another UE is a one-to-one connection or a group connection; and utilising appropriate parameters or key(s) for the one-to-one or group connection.

Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality. For example, for clarity the signal processor 308 and control processor 213 have been illustrated and described as a single processing module, whereas in other implementations they may comprise separate processing modules or logic blocks. In some examples, the signal processing module may be provided within an integrated circuit for a UE that has DMO capability, wherein the signal processing module may be arranged to: determine current network coverage and whether a call is to be initiated; determine whether permanent key and EPS AKA should be utilised, or whether DMO operation should be utilised; if DMO operation is to be utilised, whether the connection with another UE is a one-to-one connection or a group connection; and utilising appropriate parameters or key(s) for the one-to-one or group connection.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

I claim:

1. A method for key generation at a terminal device supporting at least two communication modes of operation, the method comprising, at a terminal device comprising a key derivation function:
   receiving at least one input parameter from a first wireless communication system;
   generating a first key in the key derivation function using the received at least one input parameter and at least one first locally stored input parameter in order to transmit in a first mode of operation on the first wireless communication system; and
   generating a second key in the key derivation function solely using at least one second locally stored input parameter in order to transmit in a second mode of operation on a second wireless communication system;
   wherein the at least one second locally stored input parameter is arranged to enable the second key to be used as the first key.

2. The method of claim 1 wherein generating the second key solely using the at least one second locally stored input parameter comprises determining whether the wireless terminal is to employ the second mode of operation and deriving at least one key generation parameter ($K_{ASME}$) in response thereto.

3. The method of claim 1 further comprising transmitting a message in the first mode of operation on the first wireless communication system utilizing the generated second key.

4. The method of claim 1 further comprising:
   determining that the terminal device is not within network coverage; connecting to a second terminal device in the second mode of operation; and initializing implicit authentication to connect to the second terminal device.

5. The method of claim 4, wherein initializing implicit authentication comprises the terminal device accessing from memory and using at least one from an agreed set of keys that are utilized for communicating in the second mode of operation on the second wireless communication system.

6. The method of claim 4 further comprising selecting one or more of the agreed set of keys based on at least one of:
   a previous message received from the network;
   a pre-configured set-up;

a preconfigured set-up determined during a synchronization phase;

a particular call type to be used; and a determination of received information from other terminal devices.

7. The method of claim 1 wherein generating the second key comprises replacing a derived authentication input parameter ($K_{ASME}$) received in the first mode of operation with an equivalent parameter ($K_{DMO,j}$) derived from terminal device use in the second mode of operation.

8. The method of claim 1 wherein the generated second key comprises at least one preconfigured shared key is used in a direct mode of operation (DMO) on the second wireless communication system.

9. The method of claim 8 wherein the at least one preconfigured shared key is selected from at least a single preconfigured shared key ($K_{DMO,j}$) for point-to-point communications, and a single preconfigured shared key ($K_{DMO,j}$) for group communications.

10. The method of claim 9 further comprising at least one from a group of:

receiving details of which preconfigured shared key to utilize during part of a call setup procedure in the second mode of operation; and manually or automatically refreshing the at least one preconfigured shared key to subsequent communications.

11. The method of claim 9 further comprising performing blind decoding to derive a group address from the single preconfigured shared key ($K_{DMO,j}$) for group communications.

12. The method of claim 1 wherein the generated second key uses one from a plurality of seed keys.

13. The method of claim 12 wherein the plurality of seed keys are assigned for use by different communication services.

14. The method of claim 1 further comprising automatically synchronizing with a database to derive authentication parameters when the terminal device is located in a synchronization device.

15. The method of claim 1 wherein generating the first key comprises deriving authentication parameters and determining an anonymity key ((AK) 508) based on at least a permanent key ("K" 510) and utilised to conceal a sequence number, SQN.

16. The method of claim 1 further comprising performing authentication on a message received from a second terminal device and in response thereto performing one of the following:

transmitting a reject message to the first wireless communication system, or accepting the authentication.

17. The method of claim 1 wherein the at least one first locally stored input parameter is a permanent key, K.

18. A non-transitory computer program product comprising executable program code for key generation, the executable program code operable for, when executed at the terminal device, performing the method of claim 1.

19. A terminal device comprising:

a receiver arranged to receive at least one input parameter from a first wireless communication system; and a control processor comprising a key derivation function operably coupled to the receiver and arranged to:

generate a first key using the received at least one input parameter and at least one first locally stored input parameter in order to transmit in a first mode of operation on the first wireless communication system;

generate a second key solely using at least one second locally generated stored input parameter, wherein the at least one second locally stored input parameter is arranged to enable the second key to be used as the first key; and transmit subsequently in the second mode of operation on a second wireless communication system.

20. An integrated circuit for a terminal device for supporting at least two communication modes of operation, the integrated circuit comprising:

a control processor comprising a key derivation function and arranged to:

process a received at least one input parameter from a first wireless communication system;

generate a first key using the received at least one input parameter and at least one first locally stored input parameter in order to transmit in a first mode of operation on the first wireless communication system;

generate a second key solely using at least one second locally generated stored input parameter, wherein the at least one second locally stored input parameter is arranged to enable the second key to be used as the first key; and transmit subsequently in the second mode of operation on a second wireless communication system.

* * * * *

UNITED STATES PATENT AND TRADEMARK OFFICE
CERTIFICATE OF CORRECTION

| | | |
|---|---|---|
| PATENT NO. | : 9,204,296 B2 | Page 1 of 1 |
| APPLICATION NO. | : 13/933790 | |
| DATED | : December 1, 2015 | |
| INVENTOR(S) | : Alan Edward Jones | |

It is certified that error appears in the above-identified patent and that said Letters Patent is hereby corrected as shown below:

IN THE SPECIFICATION:

Column 1, Line 8, after "entirety" insert a -- . --; and

IN THE CLAIMS:

Column 17, Claim 15, Line 44 (approximately): delete "("K" 510)" and insert -- ('K' 510) --, therefor.

Signed and Sealed this
Twenty-fourth Day of May, 2016

Michelle K. Lee
*Director of the United States Patent and Trademark Office*